United States Patent
Zhuge et al.

(10) Patent No.: US 10,027,424 B2
(45) Date of Patent: Jul. 17, 2018

(54) LOW-LATENCY ADJUSTMENT OF FLEXIBLE TRANSCEIVERS USING PILOT SIGNAL

(71) Applicants: Qunbi Zhuge, Kanata (CA); David V. Plant, Montreal (CA)

(72) Inventors: Qunbi Zhuge, Kanata (CA); David V. Plant, Montreal (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/358,638

(22) Filed: Nov. 22, 2016

(65) Prior Publication Data

US 2018/0145761 A1    May 24, 2018

(51) Int. Cl.
*H04B 10/61*  (2013.01)
*H04B 10/077*  (2013.01)
*H04B 10/40*  (2013.01)

(52) U.S. Cl.
CPC ......... *H04B 10/616* (2013.01); *H04B 10/077* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 9,705,592 B1* | 7/2017 | Schmogrow | H04B 10/075 |
| 2012/0155887 A1* | 6/2012 | Youn | H04B 10/0775 398/182 |
| 2014/0010543 A1* | 1/2014 | Lee | H04B 10/61 398/79 |
| 2016/0065326 A1* | 3/2016 | Kisaka | H04L 27/2096 398/65 |
| 2017/0078028 A1* | 3/2017 | Zhang | H04B 10/25 |

OTHER PUBLICATIONS

Jacobsen, et al., "Receiver Implemented RF Pilot Tone Phase Noise Mitigation in Coherent Optical nPSK and nQAM Systems" Optics Express, vol. 19, No. 15, Jul. 18, 2011.

(Continued)

*Primary Examiner* — David Payne
*Assistant Examiner* — Casey Kretzer
(74) *Attorney, Agent, or Firm* — Integral Intellectual Property Inc.; Miriam Paton; Amy Scouten

(57) ABSTRACT

In an optical communication system having flexible transceivers, a transmitter section of one of the flexible transceivers generates a modulated pilot signal whose amplitude or phase or both have been modulated according to a digital code. An optical signal is transmitted from the transmitter section to a receiver section of another of the flexible transceivers. The optical signal conveys data and the modulated pilot signal. The digital code encodes parameter information for the transmitter section and for the receiver section. The receiver section receives the modulated pilot signal, determines the digital code by demodulating the modulated pilot signal, and determines the parameter information from the digital code. The transmitter section and the receiver section adjust their configuration according to the parameter information. The receiver section, while configured according to the parameter information, processes received data or future received data.

16 Claims, 12 Drawing Sheets

(56) References Cited

OTHER PUBLICATIONS

S. L. Jansen, I. Morita, N. Takeda, and H. Tanaka, "20-Gb/s OFDM Transmission over 4,160-km SSMF Enabled by RF-Pilot Tone Phase Noise Compensation," in Optical Fiber Communication Conference and Exposition and The National Fiber Optic Engineers Conference, OSA Technical Digest Series (CD) (Optical Society of America, 2007), paper PDP15.

Safna, et al., "RF-Pilot Based Frequency Offset Estimation and Phase Noise Compensation for CO-OFDM Systems" International Conference on Innovations & Advances in Science, Engineering and Technology [IC—IASET 2014] Jul. 16-18, 2014.

Xiang, et al., "Modulation Format Identification Aided Hitless Flexible Coherent Transceiver" Optics Express, vol. 24, No. 14, Jul. 11, 2016.

Z. Zhang and C. Li, "Hitless Multi-rate Coherent Transceiver," in Advanced Photonics 2015, OSA Technical Digest (Optical Society of America, 2015), paper SpS3D.2.

\* cited by examiner

LOW-LATENCY ADJUSTMENT OF FLEXIBLE TRANSCEIVERS USING PILOT SIGNAL

TECHNICAL FIELD

This document relates to the technical field of communications, and more specifically, to adjustment of the configuration of flexible transceivers.

BACKGROUND

Flexible transceivers for optical networks, along with suggested applications for their use, are described in K. Roberts and C. Laperle, "Flexible Transceivers", *Proc. ECOC*, 2012. A flexible transceiver adapts to capacity availability and traffic demands by adjusting the transceiver configurations. A hitless flexible transceiver aims to adapt the transceiver configurations without interrupting network traffic.

S. L. Jansen, I. Morita, N. Takeda, H. Tanaka, "20-Gb/s OFDM Transmission over 4,160-km SSMF Enabled by RF-Pilot Tone Phase Noise Compensation", in *Optical Fiber Communication Conference and Exposition and The National Fiber Optic Engineers Conference*, OSA Technical Digest Series (CD), (Optical Society of America, 2007), paper PDP15, which is incorporated herein by reference in its entirety, describes an RF-pilot aided phase noise compensation scheme in an orthogonal frequency division multiplexing (OFDM) system. An RF-pilot tone inserted at the transmitter gets the same phase distortions as the OFDM signal and is used to remove any phase distortions from the OFDM signal at the receiver.

SUMMARY

This document proposes techniques for signaling and detecting configuration information in an optical communication system having flexible transceivers. A transmitter section of one of the flexible transceivers generates a modulated pilot signal whose amplitude or phase or both have been modulated according to a digital code. An optical signal is transmitted from the transmitter section to a receiver section of another of the flexible transceivers. The optical signal conveys data and the modulated pilot signal. The digital code encodes parameter information for the transmitter section and for the receiver section. The receiver section receives the modulated pilot signal, determines the digital code by demodulating the modulated pilot signal, and determines the parameter information from the digital code. The transmitter section and the receiver section adjust their configuration according to the parameter information. The receiver section, while configured according to the parameter information, processes received data or future received data. In cases where the transmitter section is operative to modulate only the amplitude to convey the digital code, the receiver section may perform phase noise compensation based on a pilot phase extracted from the received modulated pilot signal.

DETAILED DESCRIPTION

Figure 1:
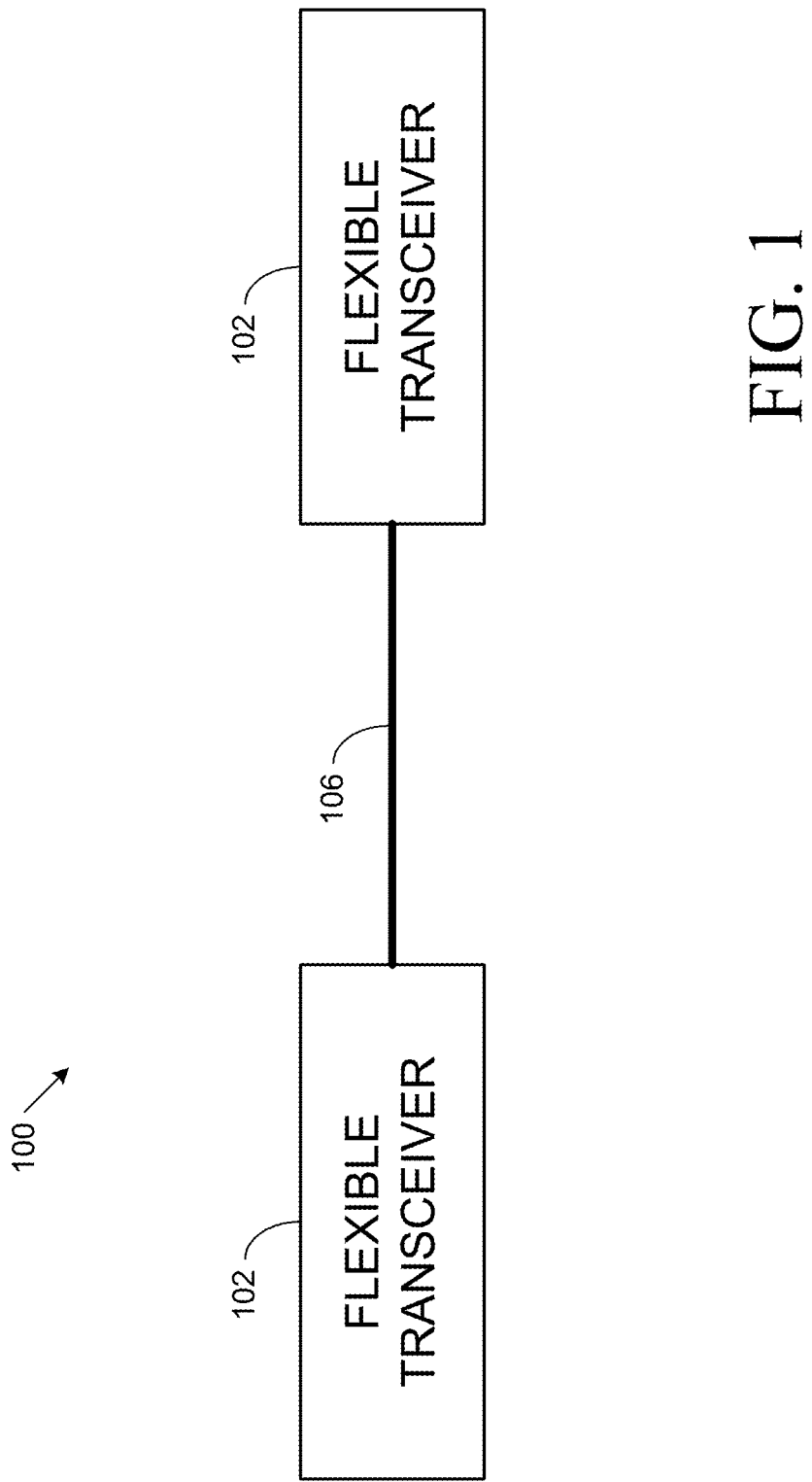
FIG. 1 illustrates a communication system that comprises flexible transceivers.

FIG. 1 illustrates an optical communication system 100 that comprises flexible transceivers 102. Data is transmitted between the flexible transceivers 102 via an optical channel 106. Various configuration parameters of the flexible transceivers 102 can be adjusted. For the optical communication system 100 to be operable, the configuration parameters of a transmitter section of one of the flexible transceivers 102 must be compatible with the configuration parameters of a receiver section of the other of the flexible transceivers 102. Examples of configuration parameters include modulation format, symbol rate, forward error correction (FEC) parameters, digital signal processing (DSP) parameters, pulse shaping parameters, the number of sub-carriers for frequency division multiplexing (FDM), chromatic dispersion compensation parameters, carrier phase recovery parameters, and digital nonlinear compensation parameters.

This document proposes using a modulated pilot signal to convey parameter information from a transmitter section of one of the flexible transceivers 102 ("transmitter") to a receiver section of another of the flexible transceivers 102 ("receiver"). The amplitude of the pilot signal may be modulated according to a digital code that encodes parameter information, for example, using an on-off keying (OOK) modulation scheme to represent the bits in the digital code. Alternatively, the phase of the pilot signal may be modulated according to a digital code that encodes parameter information, for example, using a binary phase-shift keying (BPSK) modulation scheme to represent the bits in the digital code. As a further alternative, both the amplitude and the phase of the pilot signal may be modulated according to a digital code that encodes parameter information, for example, using 16-Quadrature Amplitude Modulation (16-QAM) to represent the bits in the digital code. In cases where the phase of the pilot signal is modulated or where the phase and the amplitude of the pilot signal are modulated, the modulated pilot signal cannot be used to assist a phase noise compensation scheme at the receiver.

The transmitter transmits the modulated pilot signal concurrently with transmission of data from the transmitter over the transmission medium 106 to the receiver. The receiver receives the pilot signal, determines the digital code from the received pilot signal, and decodes the parameter information from the determined digital code. The receiver adjusts its configuration according to the parameter information that it has decoded from the received pilot signal.

The receiver processes the received data or future received data (or both) while configured according to the parameter information. The transmitter adjusts its configuration according to the parameter information.

For example, modulation format may be encoded using 4 bits according to Table 1:

TABLE 1

4-bit encoding of modulation format

| Code | Modulation Format |
|------|-------------------|
| 0000 | BPSK |
| 0001 | QPSK |
| 0010 | 8QAM |
| 0011 | 16QAM |
| 0100 | 32QAM |
| 0101 | 64QAM |
| 0110 | 128QAM |
| 0111 | 256QAM |
| 1000 | various time-domain |
| 1001 | hybrid QAM formats |
| 1010 | |
| 1011 | |
| 1100 | other formats |
| 1101 | |
| 1110 | |
| 1111 | |

In another example, symbol rate may be encoded using 4 bits according to Table 2:

TABLE 2

4-bit encoding of symbol rate

| Code | Symbol Rate (Gbaud) |
|------|---------------------|
| 0000 | 30 |
| 0001 | 32 |

TABLE 2-continued 4-bit encoding of symbol rate

| Code | Symbol Rate (Gbaud) |
|------|---------------------|
| 0010 | 35 |
| 0011 | 43 |
| 0100 | 56 |

In another example, spectrum segmentation, which is the number of subcarriers for FDM, may be encoded using 2 bits according to Table 3:

TABLE 3

2-bit encoding of spectrum segmentation

| Code | Spectrum Segmentation |
|------|----------------------|
| 00 | 1 subcarrier |
| 01 | 2 subcarriers |
| 10 | 4 subcarriers |
| 11 | 8 subcarriers |

In another example, a chromatic dispersion (CD) compensation ratio may be encoded using 3 bits according to Table 4:

TABLE 4

3-bit encoding of CD compensation ratio

| Code | CD Compensation Ratio |
|------|----------------------|
| 000 | 0 |
| 001 | 10 |
| 010 | 20 |
| 011 | 40 |
| 100 | 50 |
| 101 | 60 |
| 110 | 80 |
| 111 | 100 |

In a further example, FEC parameters or pulse shaping parameters may be encoded using 2 bits according to Table 5:

TABLE 5

2-bit encoding of FEC parameters or of pulse shaping parameters

| Code | FEC/pulse shaping Parameters |
|------|------------------------------|
| 00 | $1^{st}$ set of parameters |
| 01 | $2^{nd}$ set of parameters |
| 10 | $3^{rd}$ set of parameters |
| 11 | $4^{th}$ set of parameters |

Figure 2:
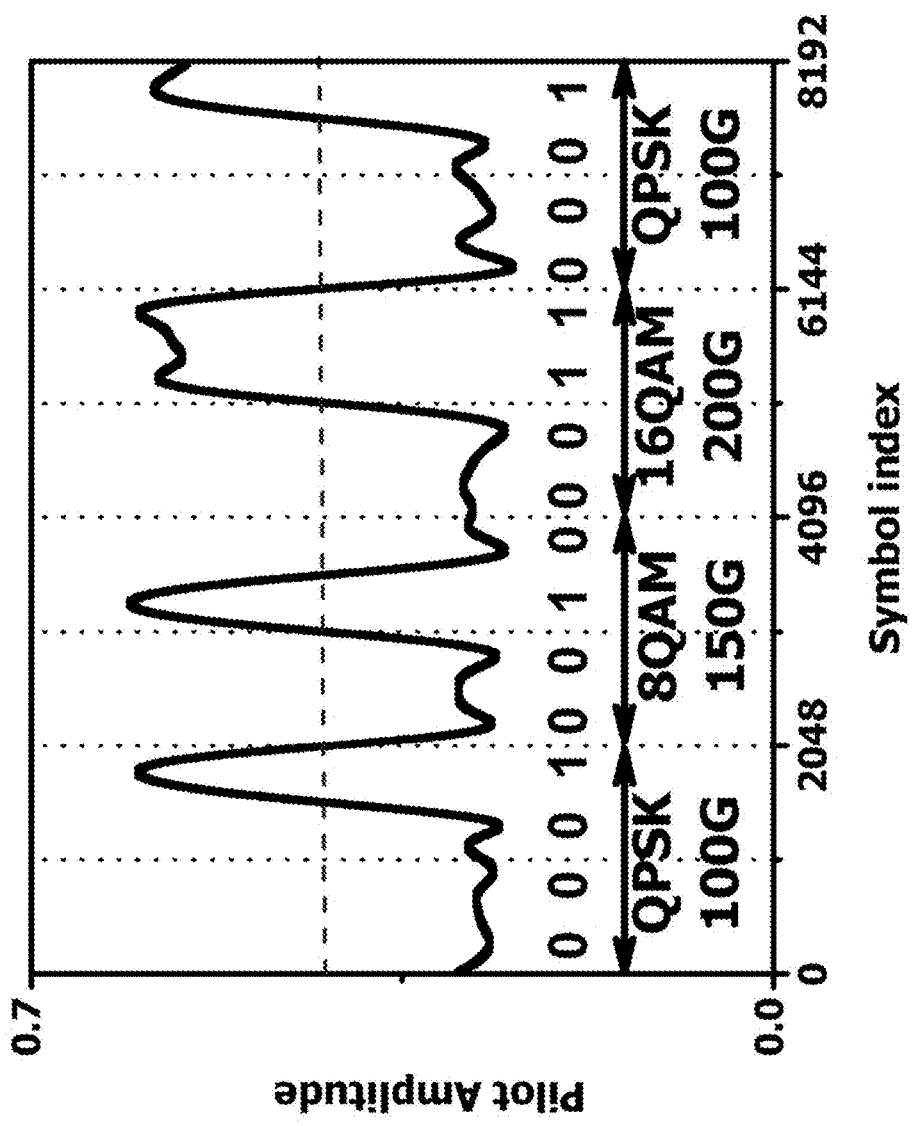
FIG. 2 illustrates the amplitude of a pilot signal modulated according to a 4-bit digital code encoding a modulation format.

FIG. 2 illustrates the amplitude of a pilot signal modulated according to a 4-bit digital code encoding a modulation format. Using the example of Table 1, the modulation format QPSK is encoded as 0001, the modulation format 8QAM is encoded as 0010, and the modulation format 16QAM is encoded as 0011.

In the example of FIG. 2, each 4-bit digital code is sent over 2048 symbols of data. The modulation format QPSK is conveyed over the $1^{st}$ block of 2048 symbols, then the modulation format 8QAM is conveyed over the $2^{nd}$ block of 2048 symbols, then the modulation format 16QAM is conveyed over the $3^{rd}$ block of 2048 symbols, and finally the modulation format QPSK is conveyed over the $4^{th}$ block of 2048 symbols.

In the example of FIG. 2, as soon as the receiver 104 has received the 1$^{st}$ block of 2048 symbols, the receiver is able to determine the digital code 0001 and to decode the digital code 0001 as encoding the modulation format QPSK. As soon as the receiver has received the 2$^{nd}$ block of 2048 symbols, the receiver is able to determine the digital code 0010 and to decode the digital code 0010 as encoding the modulation format 8QAM. As soon as the receiver has received the 3$^{rd}$ block of 2048 symbols, the receiver 104 is able to determine the digital code 0011 and to decode the digital code 0011 as encoding the modulation format 16QAM. As soon as the receiver has received the 4$^{th}$ block of 2048 symbols, the receiver is able to determine the digital code 0001 and to decode the digital code 0001 as encoding the modulation format QPSK.

In general, the receiver is able to adjust its configuration according to the conveyed parameter information as soon as the receiver has received an entire block of symbols over which the digital code was sent. The techniques proposed in this document are therefore referred to as enabling low-latency adjustment of the configuration and fast block-to-block configuration changes.

It takes a time on the order of microseconds or hundreds of nanoseconds or even tens of nanoseconds (e.g. 58 ns) to convey a modulation format by modulating amplitude or phase or both of a pilot signal according to a 4-bit digital code that encodes the modulation format, and sending the 4-bit digital code over a single block of 2048 symbols of data (by transmitting the modulated pilot signal concurrently with the single block of 2048 symbols of data). In contrast, in a conventional optical communications system having a transmitter and a receiver both capable of using different modulation formats, if an impairment occurs on the link, communication must be stopped before an external controller instructs the transmitter and the receiver to use a modulation format different from the current modulation format, and then the transmitter and the receiver need to be resynchronized. This process can take a time on the order of seconds.

Sending a 4-bit digital code over a single block of 2048 symbols of data uses only 1/512th of the bandwidth to convey the parameter information. There is a trade-off between overhead and speed of sending the code from the transmitter to the receiver. For example, more information could be conveyed by concatenating a 4-bit digital code encoding the modulation format with a 4-bit digital code encoding the symbol rate, however, sending the concatenated 8-bit digital code over a single block of 2048 symbols would use 1/256th of the bandwidth to convey the parameter information, thereby increasing the overhead. In another example, sending a 4-bit digital code encoding the modulation format over 1024 symbols would convey the modulation format twice as quickly as sending the 4-bit digital code over a single block of 2048 symbols, but would use 1/256th of the bandwidth to convey the parameter information, thereby increasing the overhead.

In some cases, the parameter information applies to the data being transmitted concurrently with the modulated pilot signal. In such cases, the transmitter configures itself according to the parameter information prior to transmitting the data and the modulated pilot signal, and the receiver configures itself according to the parameter information upon receiving the data and the modulated pilot signal, so that the receiver is configured according to the parameter information while processing the data.

In other cases, the parameter information applies to future data to be transmitted after the modulated pilot signal. In such cases, the transmitter configures itself according to the parameter information prior to transmitting the future data, and the receiver configures itself according to the parameter information after receiving the modulated pilot signal, so that the receiver is configured according to the parameter information while processing the future data.

As mentioned above, the transmitter generates a modulated pilot signal whose amplitude has been modulated, or whose phase has been modulated, or whose amplitude and phase have been modulated, the pilot signal being modulated according to a digital code that encodes parameter information. As mentioned above, the transmitter transmits the modulated pilot signal concurrently with transmission of data. The transmitter may insert the modulated pilot signal in the optical domain (discussed below with respect to FIG. 3), or in the electrical domain (discussed below with respect to FIG. 4), or in the digital domain (discussed below with respect to FIG. 5, FIG. 6, and FIG. 7).

Optical Domain Insertion of Pilot Signal

Figure 3:
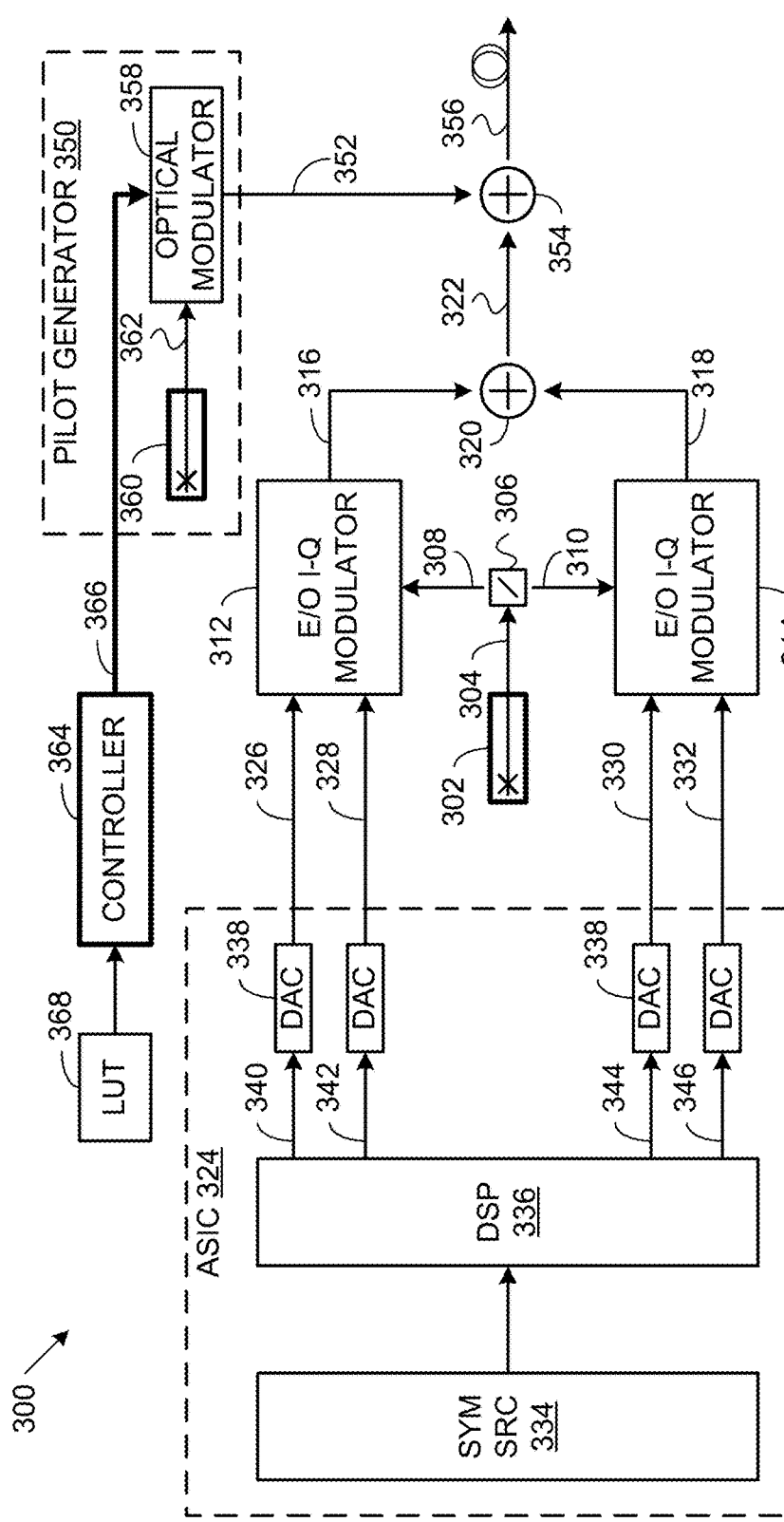
FIG. 3 is a block diagram illustration of an example transmitter section of a flexible transceiver, the transmitter section operative to insert a modulated pilot signal in the optical domain.

FIG. 3 is a block diagram illustration of an example transmitter section 300 of a flexible transceiver ("transmitter 300"), the transmitter 300 operative to insert a modulated pilot signal in the optical domain. The transmitter 300 employs polarization-division multiplexing (PDM). A laser 302 is operative to generate a continuous wave (CW) optical carrier 304. A polarizing beam splitter 306 is operative to split the CW optical carrier 304 into orthogonally-polarized components 308, 310 that are modulated by respective electrical-to-optical modulators 312, 314 to produce modulated polarized optical signals 316, 318 that are combined by a beam combiner 320, thus yielding an optical signal 322.

An application-specific integrated circuit (ASIC) 324 is operative to produce in-phase (I) and quadrature (Q) analog drive signals 326, 328 to drive the electrical-to-optical modulator 312. The ASIC 324 is operative to produce I and Q analog drive signals 330, 332 to drive the electrical-to-optical modulator 314. The ASIC 324 comprises a symbol source 334, a digital signal processor (DSP) 336, and digital-to-analog converters (DACs) 338. The symbol source 334 is operative to generate a stream of symbols representing data to be transmitted in the optical signal 322. The DSP 336 is operative to process the symbols output from the symbol source 334, for example, performing one or more of pulse shaping, subcarrier multiplexing, chromatic dispersion precompensation, and distortion precompensation on the symbols. The DSP 336 is operative to generate I and Q digital drive signals 340, 342 to be converted by DACs 338 into the I and Q analog drive signals 326, 328, respectively, and to generate I and Q digital drive signals 344, 346 to be converted by DACs 338 into the I and Q analog drive signals 330, 332, respectively. The ASIC 324 may comprise additional components that are not described in this document.

A pilot generator 350 is operative to generate a modulated pilot signal 352 in the optical domain. A beam combiner 354 is operative to combine the optical signal 322 and the modulated pilot signal 352 into a final optical signal 356 for transmission. The pilot generator 350 comprises an optical modulator 358 and a laser 360 that is operative to generate a constant-amplitude continuous wave optical signal 362. (In some implementations, the laser 302 may be reused as the laser 360, with the transmitter 300 comprising additional optical elements if needed, such as a beam splitter.) A controller 364 is operative to generate a drive signal 366 and to control the optical modulator 358 per the drive signal 366 to modulate the amplitude of the signal 362, or to modulate the phase of the signal 362, or to modulate both the amplitude and the phase of the signal 362, to convey a digital code that encodes parameter information. The output of the optical modulator 358 is the modulated pilot signal 352. In some cases, the parameter information is stored in a look up table (LUT) 368, and the controller 364 is operative to read the parameter information from the LUT 368.

Electrical Domain Insertion of Pilot Signal

Figure 4:
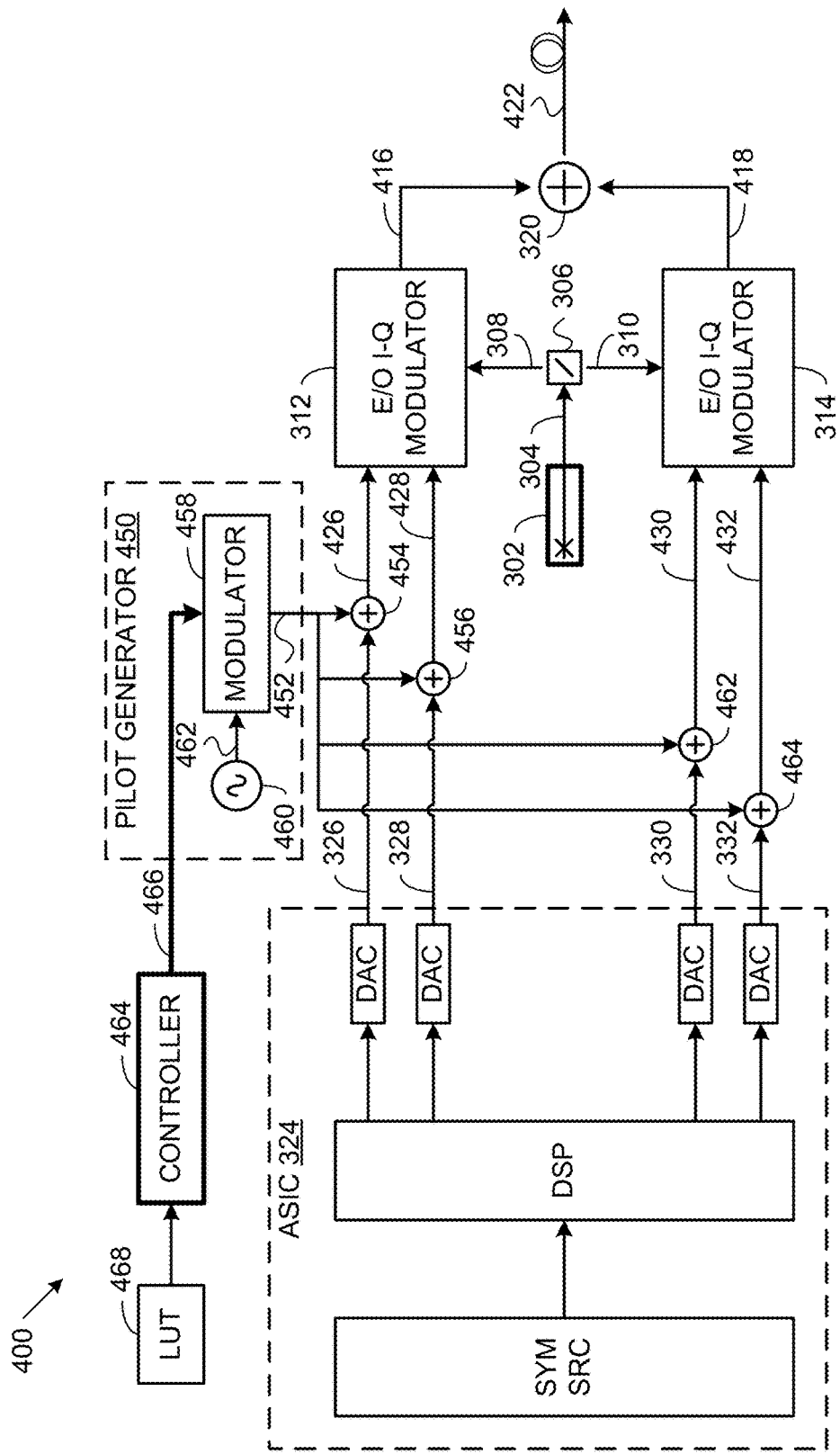
FIG. 4 is a block diagram illustration of an example transmitter section of a flexible transceiver, the transmitter section operative to insert a modulated pilot signal in the electrical domain.

FIG. 4 is a block diagram illustration of an example transmitter section 400 of a flexible transceiver ("transmitter 400"), the transmitter 400 operative to insert a modulated pilot signal in the electrical domain. The transmitter 400 employs polarization-division multiplexing (PDM). The transmitter 400 comprises the laser 302, the polarizing beam splitter 306, the electrical-to-optical modulators 312, 314, and the beam combiner 320 described above with respect to FIG. 3. The transmitter 400 comprises the ASIC 324 described above with respect to FIG. 3.

A pilot generator 450 is operative to generate a modulated pilot signal 452 in the electrical domain. Combiners 454, 456 combine the modulated pilot signal 452 with the I and Q analog drive signals 326, 328 to yield I and Q analog composite drive signals 426, 428 to drive the electrical-to-optical modulator 312. Combiners 462, 464 combine the modulated pilot signal 452 with the I and Q analog drive signals 330, 332 to yield I and Q analog composite drive signals 430, 432 to drive the electrical-to-optical modulator 314. Modulation by the electrical-to-optical modulator 312 of the orthogonally-polarized component 308 of the CW optical carrier 304, while the electrical-to-optical modulator 312 is driven by the I and Q analog composite drive signals 426, 428 produces a modulated polarized optical signal 416. Modulation by the electrical-to-optical modulator 314 of the orthogonally-polarized component 310 of the CW optical carrier 304, while the electrical-to-optical modulator 314 is driven by the I and Q analog composite drive signals 430, 432 produces a modulated polarized optical signal 418. The beam combiner 320 is operative to combine the modulated polarized optical signals 416, 418, thus yielding an optical signal 422 for transmission.

The pilot generator 450 comprises a modulator 458 and a local oscillator 460. The local oscillator 460 is operative to generate a constant-amplitude continuous wave electrical pilot signal 462. In general, the pilot signal 462 is at a frequency within the signal spectrum to prevent increasing the total bandwidth. A controller 464 is operative to generate a drive signal 466 and to control the modulator 458 per the drive signal 466 to modulate the amplitude of the pilot signal 462, or to modulate the phase of the pilot signal 462, or to modulate both the amplitude and the phase of the pilot signal 462, to convey a digital code that encodes parameter information. The output of the modulator 458 is the modulated pilot signal 452. In some cases, the parameter information is stored in a look up table (LUT) 468, and the controller 464 is operative to read the parameter information from the LUT 468.

The controller 364, 464 is operative to adjust configuration of relevant components of the transmitter 300, 400 according to the parameter information. For example, the controller 364, 464 is operative to adjust configuration of the symbol source 334, the DSP 336, a clock frequency, and FEC encoding parameters according to a value of a symbol rate parameter. Parameters whose values may be provided by the controller 364, 464 to the DSP 336 include a chromatic dispersion (CD) compensation ratio parameter, pulse shaping parameters, and other DSP parameters.

Digital Domain Insertion of Pilot Signal

Figure 5:
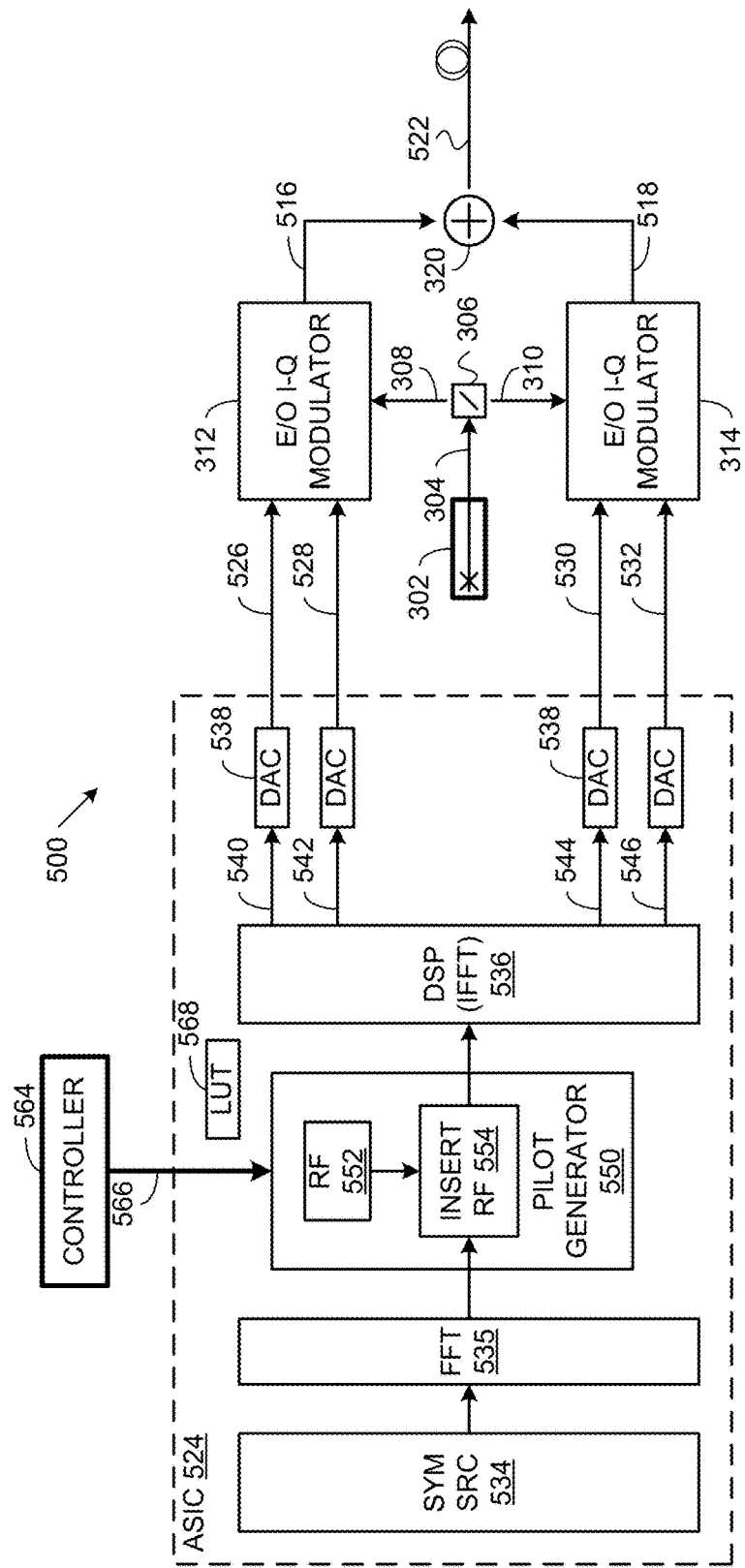
FIG. 5 is a block diagram illustration of an example transmitter section of a flexible transceiver, the transmitter section operative to insert a modulated pilot signal in the digital domain, the transmitter section employing orthogonal frequency division multiplexing (OFDM)

FIG. 5 is a block diagram illustration of an example transmitter section 500 of a flexible transceiver ("transmitter 500"), the transmitter 500 operative to insert a modulated pilot signal in the digital domain. The transmitter 500 employs orthogonal frequency division multiplexing (OFDM) and polarization-division multiplexing (PDM). The transmitter comprises the laser 302, the polarizing beam splitter 306, the electrical-to-optical modulators 312, 314, and the beam combiner 320 described above with respect to FIG. 3.

An application-specific integrated circuit (ASIC) 524 is operative to produce in-phase (I) and quadrature (Q) analog drive signals 526, 528 to drive the electrical-to-optical modulator 312. The ASIC 524 is operative to produce I and Q analog drive signals 530, 532 to drive the electrical-to-optical modulator 314. The ASIC 524 comprises a symbol source 534, a DSP 536, digital-to-analog converters (DACs) 538, and a pilot generator 550. The DSP 536 is operative to generate I and Q digital drive signals 540, 542 to be converted by the DACs 538 into the I and Q analog drive signals 526, 528, respectively, and to generate I and Q digital drive signals 544, 546 to be converted by the DACs 538 into the I and Q analog drive signals 530, 532, respectively. The ASIC 524 may comprise additional components that are not described in this document.

Modulation by the electrical-to-optical modulator 312 of the orthogonally-polarized component 308 of the CW optical carrier 304, while the electrical-to-optical modulator 312 is driven by the I and Q analog drive signals 526, 528, produces a modulated polarized optical signal 516. Modulation by the electrical-to-optical modulator 314 of the orthogonally-polarized component 310 of the CW optical carrier 304, while the electrical-to-optical modulator 314 is driven by the I and Q analog drive signals 530, 532, produces a modulated polarized optical signal 518. The beam combiner 320 is operative to combine the modulated polarized optical signals 516, 518, thus yielding an optical signal 522 for transmission.

The symbol source 534 is operative to generate a stream of symbols representing data to be transmitted in the optical signal 522. A Fast Fourier Transform (FFT) module 535 is operative to convert the stream of symbols to the frequency domain, thus yielding a digital signal spectrum. The pilot generator 550 is a digital function which adds a modulated digital pilot signal at a certain frequency in the digital signal spectrum. The pilot generator 550 comprises a RF module 552 and an insert RF module 554. A LUT 568 is operative to store encoding bits for the modulated digital pilot signal, the encoding bits conveying a digital code that encodes parameter information. A controller 564 is operative to provide an address of the LUT 568 to the pilot generator 550 (the providing of the LUT address indicated by an arrow 566). The RF module 552 is operative to read from the LUT 568 the encoding bits given by the address provided by the controller 564 and to generate digital samples representing the modulated digital pilot signal. The insert RF module 554 is operative to insert the digital samples generated by the RF module 552 into the digital signal spectrum, thus yielding a modified digital signal spectrum.

The DSP 536 is operative to process the modified digital signal spectrum and to generate the I and Q analog drive signals 540, 542, 544, 546. In this example, processing by the DSP 536 includes performing an inverse Fourier transform, for example, an Inverse Fast Fourier Transform (IFFT). In other implementations, insertion of the modulated pilot signal may occur in the time domain after the processing by the DSP 536.

Figure 6:
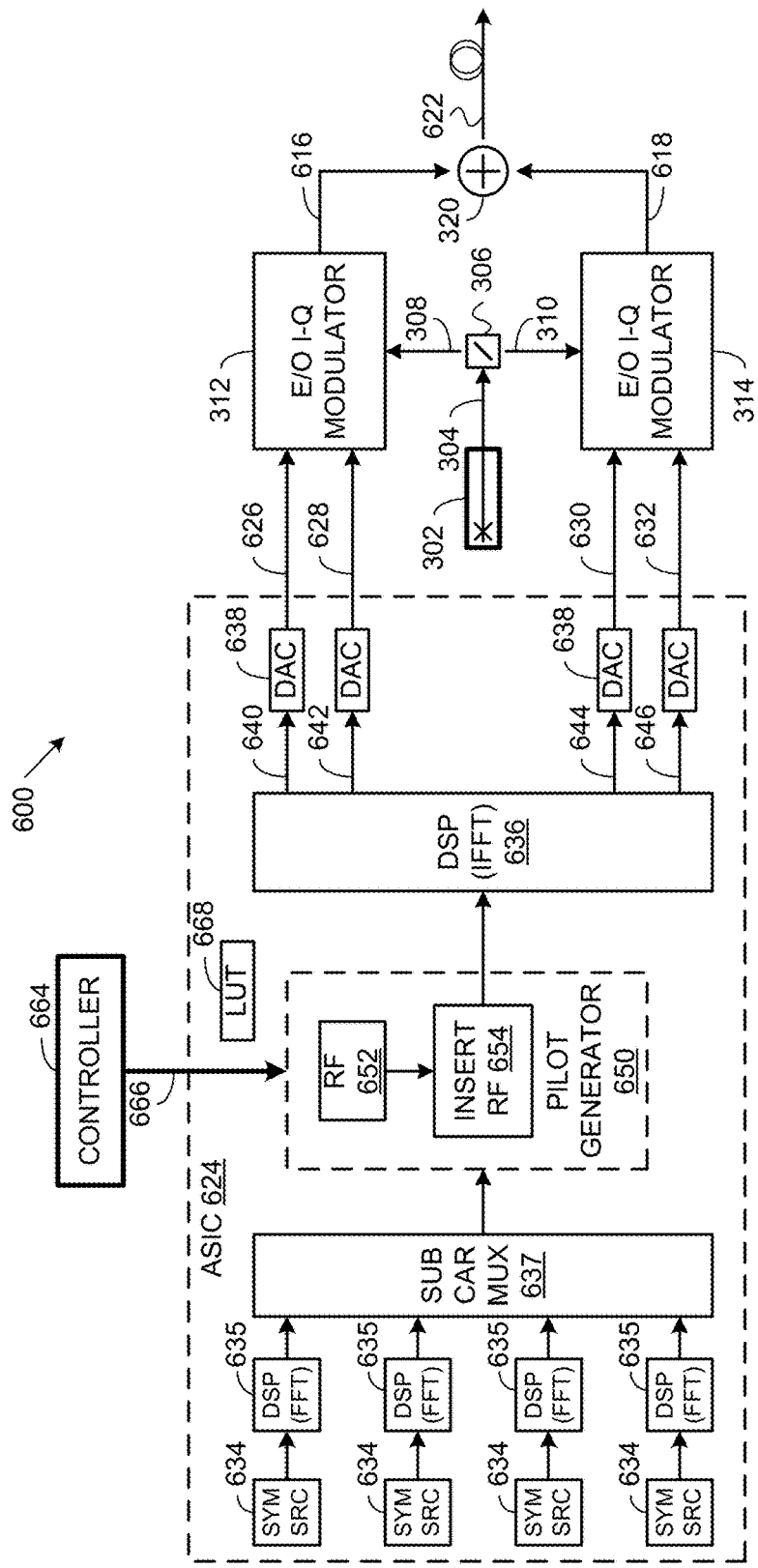
FIG. 6 is a block diagram illustration of an example transmitter section of a flexible transceiver, the transmitter section operative to insert a modulated pilot signal in the digital domain, the transmitter section employing frequency division multiplexing (FDM)

FIG. 6 is a block diagram illustration of another example transmitter section 600 of a flexible transceiver ("transmitter 600"), the transmitter 600 operative to insert a modulated pilot signal in the digital domain. The transmitter 600 employs frequency division multiplexing (FDM) and polarization-division multiplexing (PDM). The transmitter comprises the laser 302, the polarizing beam splitter 306, the electrical-to-optical modulators 312, 314, and the beam combiner 320 described above with respect to FIG. 3.

An application-specific integrated circuit (ASIC) 624 is operative to produce in-phase (I) and quadrature (Q) analog drive signals 626, 628 to drive the electrical-to-optical modulator 312. The ASIC 624 is operative to produce I and Q analog drive signals 630, 632 to drive the electrical-to-optical modulator 314. The ASIC 624 comprises multiple symbol sources 634, multiple subcarrier DSPs 635, a subcarrier multiplexing module 637, a DSP 636, digital-to-analog converters (DACs) 638, and a pilot generator 650. The DSP 636 is operative to generate I and Q digital drive signals 640, 642 to be converted by the DACs 638 into the I and Q analog drive signals 626, 628, respectively, and to generate I and Q digital drive signals 644, 646 to be converted by the DACs 638 into the I and Q analog drive signals 630, 632, respectively. The ASIC 624 may comprise additional components that are not described in this document.

Modulation by the electrical-to-optical modulator 312 of the orthogonally-polarized component 308 of the CW optical carrier 304, while the electrical-to-optical modulator 312 is driven by the I and Q analog drive signals 626, 628, produces a modulated polarized optical signal 616. Modulation by the electrical-to-optical modulator 314 of the orthogonally-polarized component 310 of the CW optical carrier 304, while the electrical-to-optical modulator 314 is driven by the I and Q analog drive signals 630, 632, produces a modulated polarized optical signal 618. The beam combiner 320 is operative to combine the modulated polarized optical signals 616, 618, thus yielding an optical signal 622 for transmission.

The symbol sources 634 are operative to generate subcarrier streams of symbols representing data to be transmitted in the optical signal 622. The subcarrier DSPs 635 are operative to process the symbols output by respective ones of the symbol sources 634, for example, by performing pulse shaping and distortion precompensation, and to implement a Fast Fourier Transform (FFT) to convert the symbols to the frequency domain, thus yielding a digital subcarrier signal spectrum. The subcarrier multiplexing module 637 is operative to multiplex the digital subcarrier signal spectrums output from the subcarrier DSPs 635 into a single multiplexed digital signal spectrum.

The pilot generator 650 is a digital function which adds a modulated digital pilot signal at a certain frequency in the digital signal spectrum. The pilot generator 650 comprises a RF module 652 and an insert RF module 654. A LUT 668 is operative to store encoding bits for the modulated digital pilot signal, the encoding bits conveying a digital code that encodes parameter information. A controller 664 is operative to provide an address of the LUT 668 to the pilot generator 650 (the providing of the LUT address indicated by an arrow 666). The RF module 652 is operative to read from the LUT 668 the encoding bits given by the address provided by the controller 664 and to generate digital samples representing the modulated digital pilot signal. The insert RF module 654 is operative to insert the digital samples generated by the RF module 652 into the digital signal spectrum, thus yielding a modified digital signal spectrum.

The DSP 636 is operative to process the modified digital signal spectrum, to implement an Inverse FFT (IFFT) as part of its processing, and to generate the I and Q analog drive signals 640, 642, 644, 646. In other implementations, insertion of the modulated pilot signal may occur in the time domain after the processing by the DSP 636.

Techniques for inserting an unmodulated pilot signal in the middle of a transmitted spectrum of an OFDM signal are described in S. L. Jansen, I. Morita, N. Takeda, H. Tanaka, "20-Gb/s OFDM Transmission over 4,160-km SSMF Enabled by RF-Pilot Tone Phase Noise Compensation", in *Optical Fiber Communication Conference and Exposition and The National Fiber Optic Engineers Conference*, OSA Technical Digest Series (CD), (Optical Society of America, 2007), paper PDP 15, which is incorporated herein by reference in its entirety. The pilot generator 650 uses similar techniques to insert the modulated digital pilot signal into the digital signal spectrum output by the subcarrier multiplexing module 637.

Figure 7:
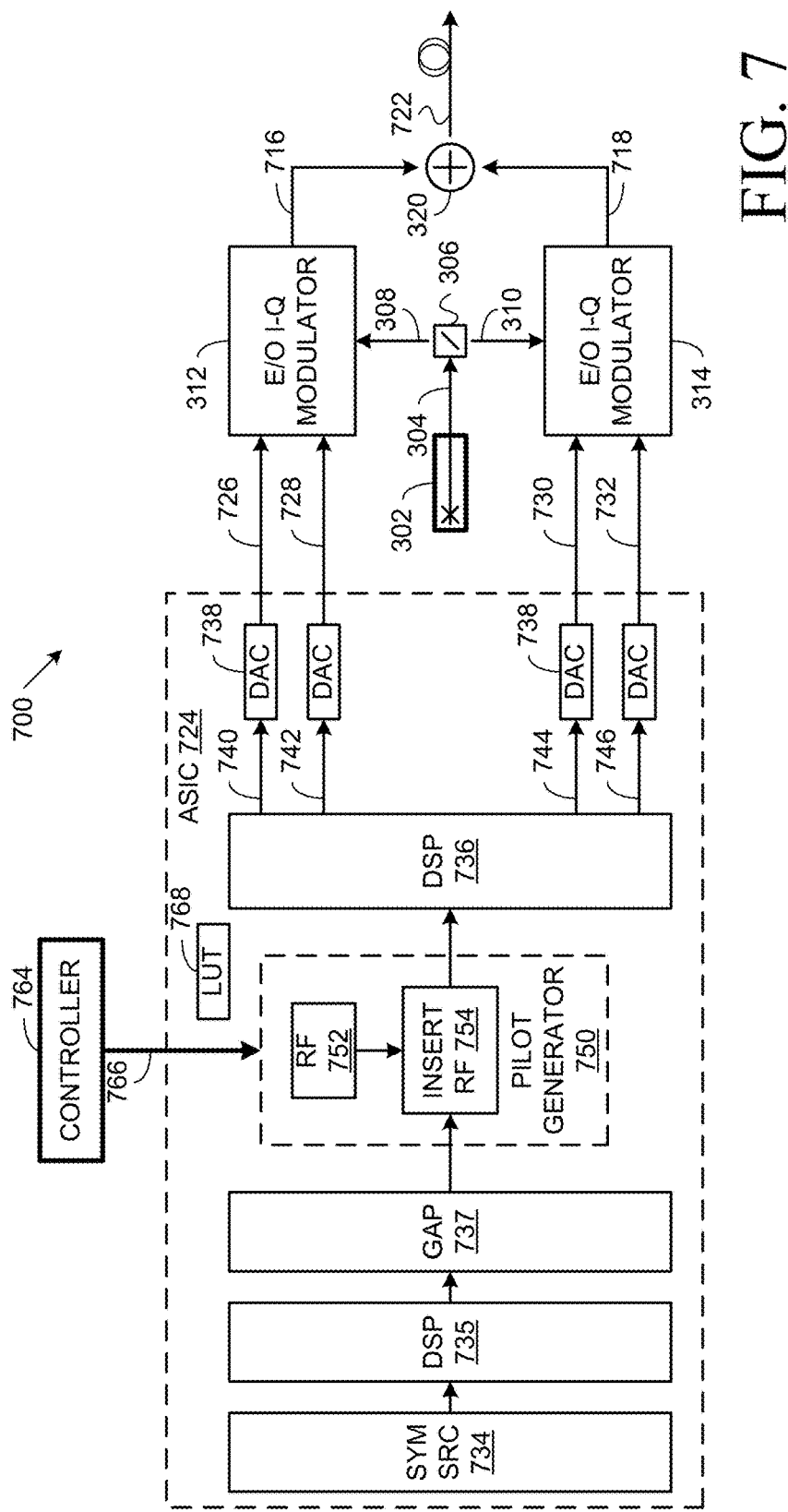
FIG. 7 is a block diagram illustration of an example transmitter section of a flexible transceiver, the transmitter section operative to insert a modulated pilot signal in the digital domain, the transmitter section employing a single carrier (SC)

FIG. 7 is a block diagram illustration of another example transmitter section 700 of a flexible transceiver ("transmitter 700"), the transmitter 700 operative to insert a modulated pilot signal in the digital domain. The transmitter 700 employs a single carrier (SC) and polarization-division multiplexing (PDM). The transmitter comprises the laser 302, the polarizing beam splitter 306, the electrical-to-optical modulators 312, 314, and the beam combiner 320 described above with respect to FIG. 3.

An application-specific integrated circuit (ASIC) 724 is operative to produce in-phase (I) and quadrature (Q) analog drive signals 726, 728 to drive the electrical-to-optical modulator 312. The ASIC 724 is operative to produce I and Q analog drive signals 730, 732 to drive the electrical-to-optical modulator 314. The ASIC 724 comprises a symbol source 734, a first DSP 735, a spectrum gap generator 737, a second DSP 736, digital-to-analog converters (DACs) 738, and a pilot generator 750. The DSP 736 is operative to generate I and Q digital drive signals 740, 742 to be converted by the DACs 738 into the I and Q analog drive signals 726, 728, respectively, and to generate I and Q digital drive signals 744, 746 to be converted by the DACs 738 into the I and Q analog drive signals 730, 732, respectively. The ASIC 724 may comprise additional components that are not described in this document.

Modulation by the electrical-to-optical modulator 312 of the orthogonally-polarized component 308 of the CW optical carrier 304, while the electrical-to-optical modulator 312 is driven by the I and Q analog drive signals 726, 728, produces a modulated polarized optical signal 716. Modulation by the electrical-to-optical modulator 314 of the orthogonally-polarized component 310 of the CW optical carrier 304, while the electrical-to-optical modulator 314 is driven by the I and Q analog drive signals 730, 732, produces a modulated polarized optical signal 718. The beam combiner 320 is operative to combine the modulated polarized optical signals 716, 718, thus yielding an optical signal 722 for transmission.

The symbol source 734 is operative to generate a stream of symbols representing data to be transmitted in the optical signal 722. The first DSP 735 is operative to process the symbols output by the symbol source 734, for example, by performing pulse shaping and distortion precompensation on the symbols. The spectrum gap generator 737 is operative to create a gap in the spectrum of the processed symbols output by the first DSP 735, for example, by performing single-sideband (SSB) subcarrier modulation by means of Hilbert filtering.

The pilot generator 750 is a digital function which adds a modulated digital pilot signal at a certain frequency in the digital signal spectrum. The pilot generator 750 comprises a RF module 752 and an insert RF module 754. A LUT 768 is operative to store encoding bits for the modulated digital pilot signal, the encoding bits conveying a digital code that encodes parameter information. A controller 764 is operative to provide an address of the LUT 768 to the pilot generator 750 (the providing of the LUT address indicated by an arrow 766). The RF module 752 is operative to read from the LUT 768 the encoding bits given by the address provided by the controller 764 and to generate digital samples representing the modulated digital pilot signal. The insert RF module 754 is operative to insert the digital samples generated by the RF module 752 into the digital signal spectrum, thus yielding a modified digital signal spectrum.

The second DSP 736 is operative to process the modified digital signal spectrum and to generate the I and Q analog drive signals 740, 742, 744, 746.

Techniques for creating a spectrum gap and for inserting an unmodulated pilot signal in the middle of a transmitted spectrum of an SC signal are described in M. Morsy-Osman, Q. Zhuge, L. Chen, and D. Plant, "Joint mitigation of laser phase noise and fiber nonlinearity for polarization-multiplexed QPSK and 16-QAM coherent transmission systems", *Opt. Express* vol. 19, pp. B329-B336 (2011), which is incorporated herein by reference in its entirety. The pilot generator 750 uses similar techniques to insert the modulated pilot signal into the stream of processed symbols.

Figure 8:
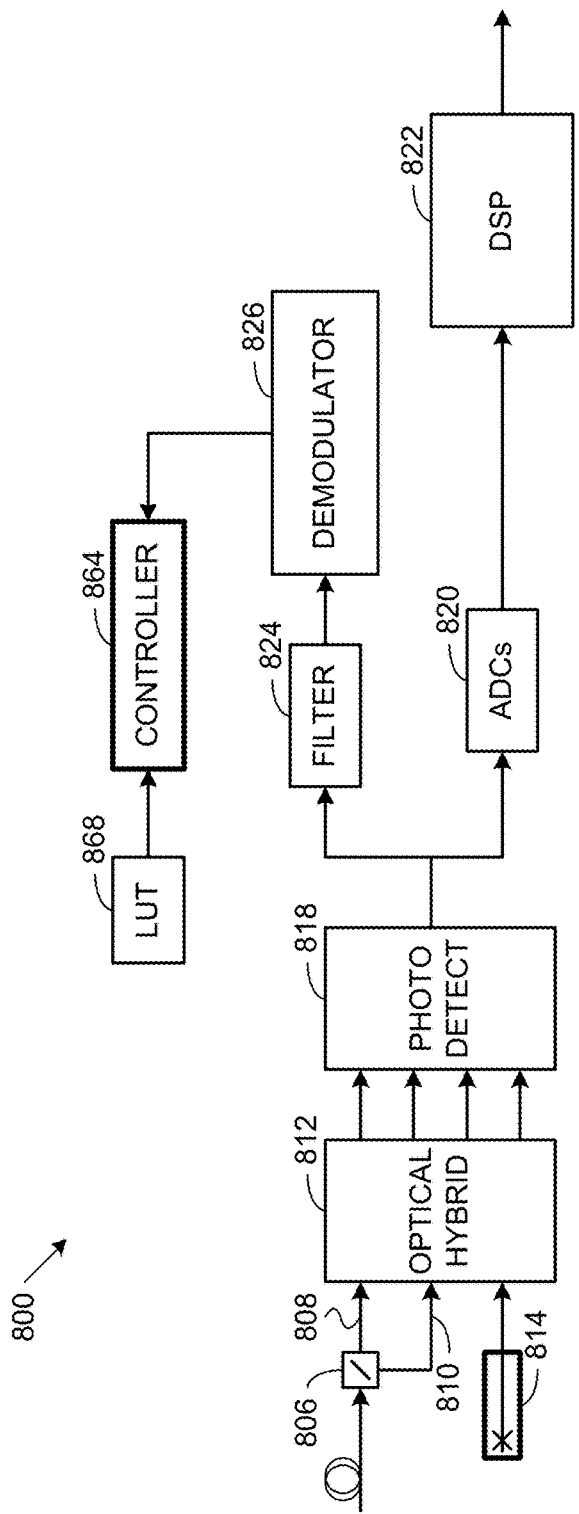
FIG. 8 is a block diagram illustration of an example receiver section of a flexible receiver, the receiver section operative to determine a digital code from a received pilot signal, and to decode parameter information from the digital code.

FIG. 8 is a block diagram illustration of an example receiver section of a flexible transceiver ("receiver 800"), the receiver 800 operative to determine a digital code from a received pilot signal, and to decode parameter information from the digital code. A polarizing beam splitter 806 is operative to split a received optical signal into orthogonally-polarized components 808, 810. An optical hybrid 812 is operative to process the components with respect to an optical signal produced by a laser 814. Photodetectors 818 are operative to convert the output of the optical hybrid 812 to electrical signals corresponding to the I and Q components on both polarizations, and analog-to-digital converters (ADCs) 820 are operative to sample the electrical signals. A DSP 822 is operative to process the output of the ADCs 820 to recover the data that was transmitted.

A filter 824, for example a low-pass filter (LPF) or a band-pass filter (BPF), is operative to isolate an electrical modulated pilot signal from the output of the photodetectors 818. A demodulator 826 is operative to determine a digital code from the electrical modulated pilot signal, and to provide the digital code to a controller 864. The controller 864 is operative to decode parameter information from the digital code. In some cases, the parameter information is stored in a look up table (LUT) 868, and the controller 864 is operative to read the parameter information from the LUT 868. The controller 864 is operative to use the decoded parameter information to adjust configuration of the receiver 800, thereby affecting how the receiver 800 handles the received optical signal. For example, adjusting configuration of the DSP 822 affects how the DSP 822 processes the output of the ADCs 820 or future output of the ADCs 820 or both to recover the data that was transmitted or to recover future data or both. In some implementations, the controller 864 is embodied in the DSP 822.

Figure 9:
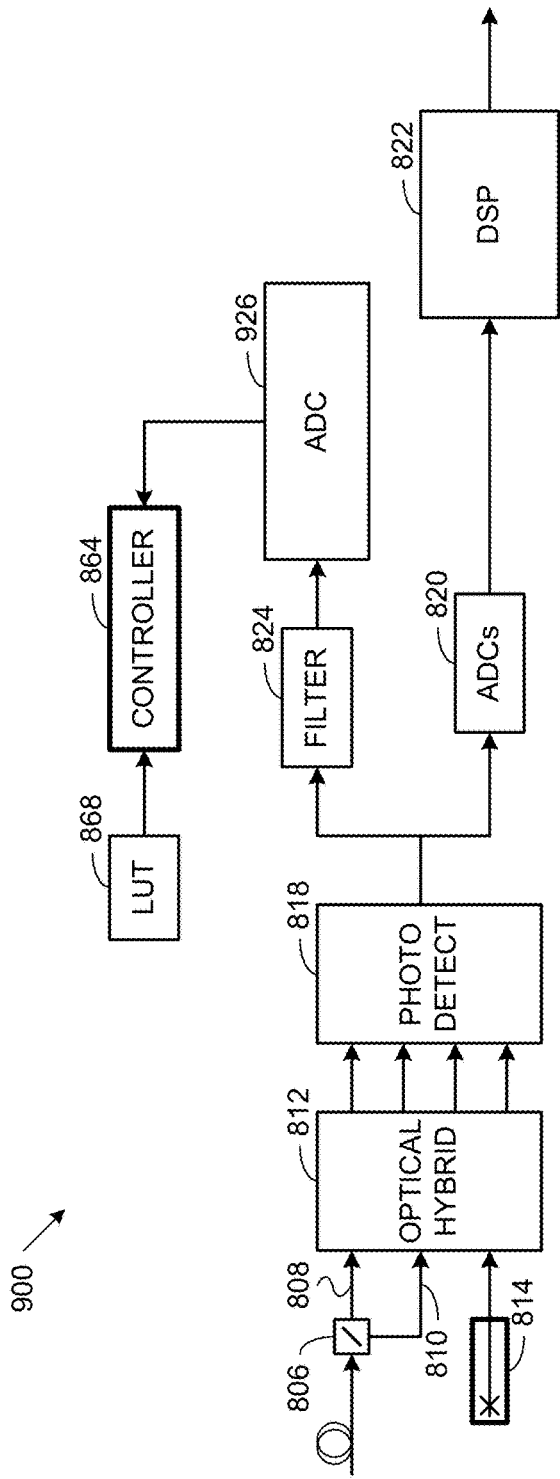
FIG. 9 is a block diagram illustration of another example receiver section of a flexible transceiver, the receiver section operative to determine a digital code from a received pilot signal and to decode parameter information from the digital code.

FIG. 9 is a block diagram illustration of another example receiver section of a flexible transceiver ("receiver 900"), the receiver 900 operative to determine a digital code from a received pilot signal, and to decode parameter information from the digital code. The receiver 900 is identical to the receiver 800 described above with respect to FIG. 8, except that in place of the demodulator 826, the receiver 900 comprises an ADC 926 to digitize the electrical modulated pilot signal. Digitization of the electrical modulated pilot signal effectively determines a digital code from the electrical modulated pilot signal, and the digital code is provided to the controller 864.

Figure 10:
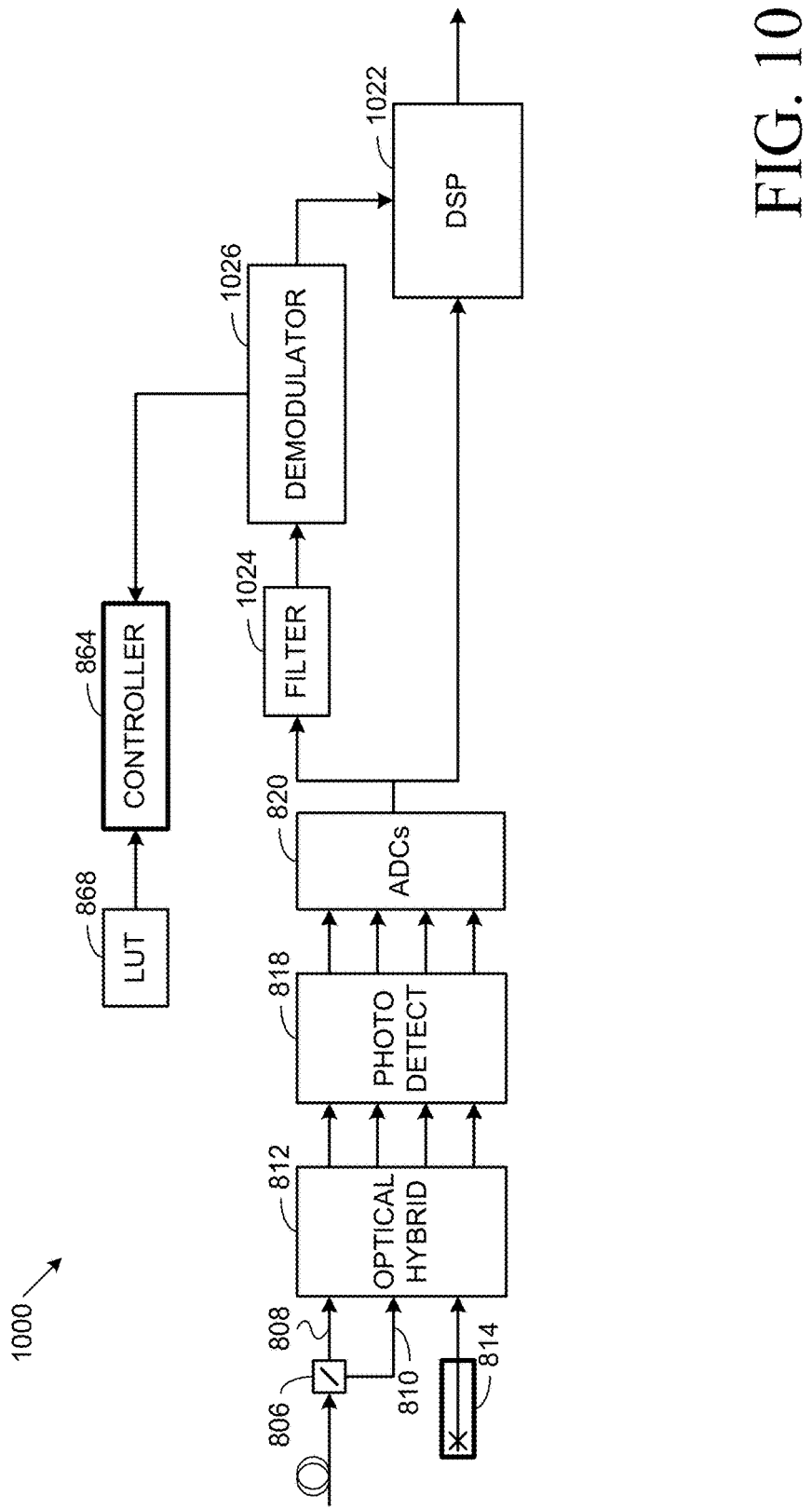
FIG. 10 is a block diagram illustration of yet another example receiver section of a flexible transceiver, the receiver section operative to determine a digital code from a received pilot signal and to decode parameter information from the digital code.

FIG. 10 is a block diagram illustration of yet another example receiver section of a flexible transceiver ("receiver 1000"), the receiver 1000 operative to determine a digital code from a received pilot signal, and to decode parameter information from the digital code. The receiver 1000 comprises the polarizing beam splitter 806, the optical hybrid 812, the laser 814, the photodetectors 818, the ADCs 820, the controller 864, and the LUT 868 described above with respect to FIG. 8.

A filter 1024, for example a LPF or a BPF, is operative to isolate the digitized modulated pilot signal from the output of the ADCs 820. A demodulator 1026 is operative to determine a digital code from the digitized modulated pilot signal, and to provide the digital code to the controller 864.

A DSP 1022 is operative to process the output of the ADCs 820 to recover the data that was transmitted. In some implementations, the DSP 1022 is identical to the DSP 822 described above with respect to FIG. 8. In other implementations, where only the amplitude of the pilot signal is modulated to convey a digital code that encodes parameter information, the DSP 1022 may also be operative to handle phase noise compensation.

The receivers 800, 900 and 1000 are compatible with a transmitter that employs FDM or OFDM, because the DSP 822 will process only the frequencies of interest and ignore the pilot signal. The receivers 800, 900 and 1000 may be compatible with a transmitter that employs SC if the DSP 822 removes the spectrum gap inserted by the transmitter.

Figure 11:
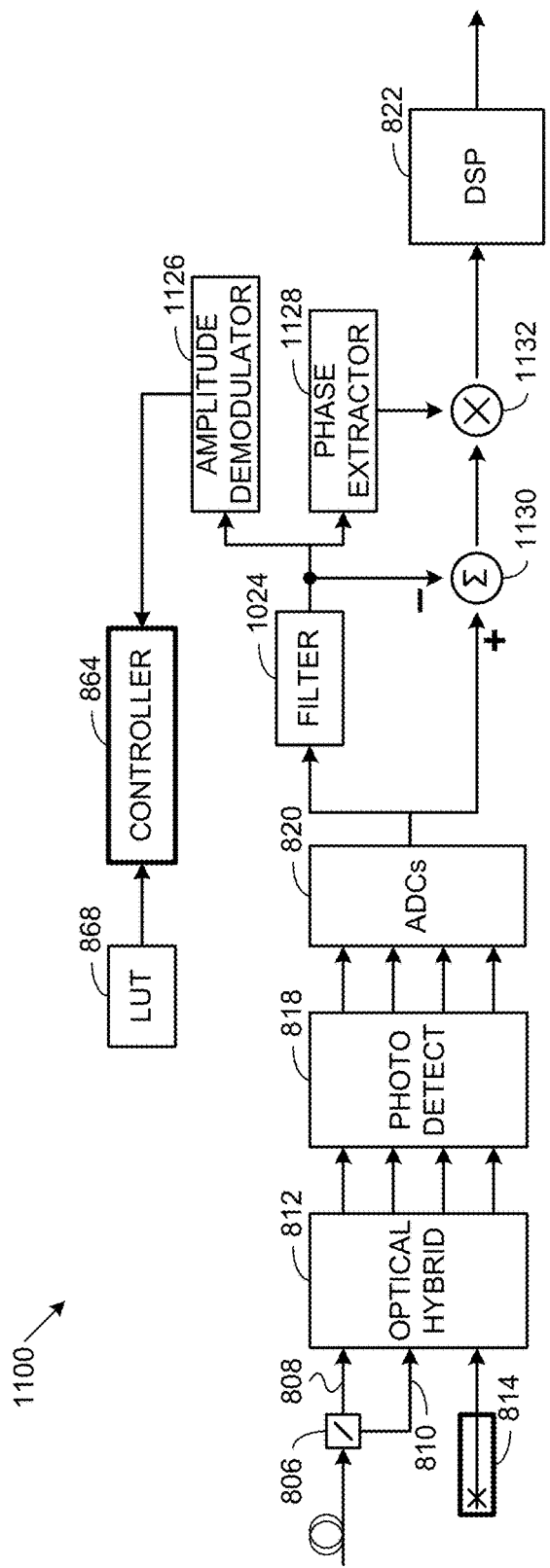
FIG. 11 is a block diagram illustration of a further example receiver section of a flexible transceiver, the receiver section operative to perform phase noise compensation based on the phase of a received pilot signal, to determine a digital code from the amplitude of the received pilot signal, and to decode parameter information from the digital code.

FIG. 11 is a block diagram illustration of a further example receiver section of a flexible transceiver ("receiver 1100"), the receiver 1100 operative to perform phase noise compensation based on the phase of a received amplitude-modulated pilot signal, and operative to determine a digital code from the amplitude of the received amplitude-modulated pilot signal, and to decode parameter information from the digital code. The receiver 1100 comprises the polarizing beam splitter 806, the optical hybrid 812, the laser 814, the photodetectors 818, the ADCs 820, the DSP 822, the controller 864 and the LUT 868 described above with respect to FIG. 8. The receiver 1100 comprises the filter 1024 described above with respect to FIG. 10.

An amplitude demodulator 1126 is operative to determine a digital code from the digitized amplitude-modulated pilot signal, and to provide the digital code to the controller 864. A phase extractor 1128 is operative to determine a pilot phase from the digitized amplitude-modulated pilot signal. A subtraction element 1130 is operative to remove the digitized amplitude-modulated pilot signal from the output of the ADCs 820. A multiplication element 1132 is operative to use the pilot phase to compensate for phase noise in the output of the subtraction element 1130. The DSP 822 is operative to process the phase-noise-compensated output of the multiplication element 1132 to recover the data that was transmitted.

The receiver 1100 is compatible with a transmitter that employs SC, FDM or OFDM, because the pilot signal is removed from the output of the ADCs 820 before processing by the DSP 822.

Figure 12:
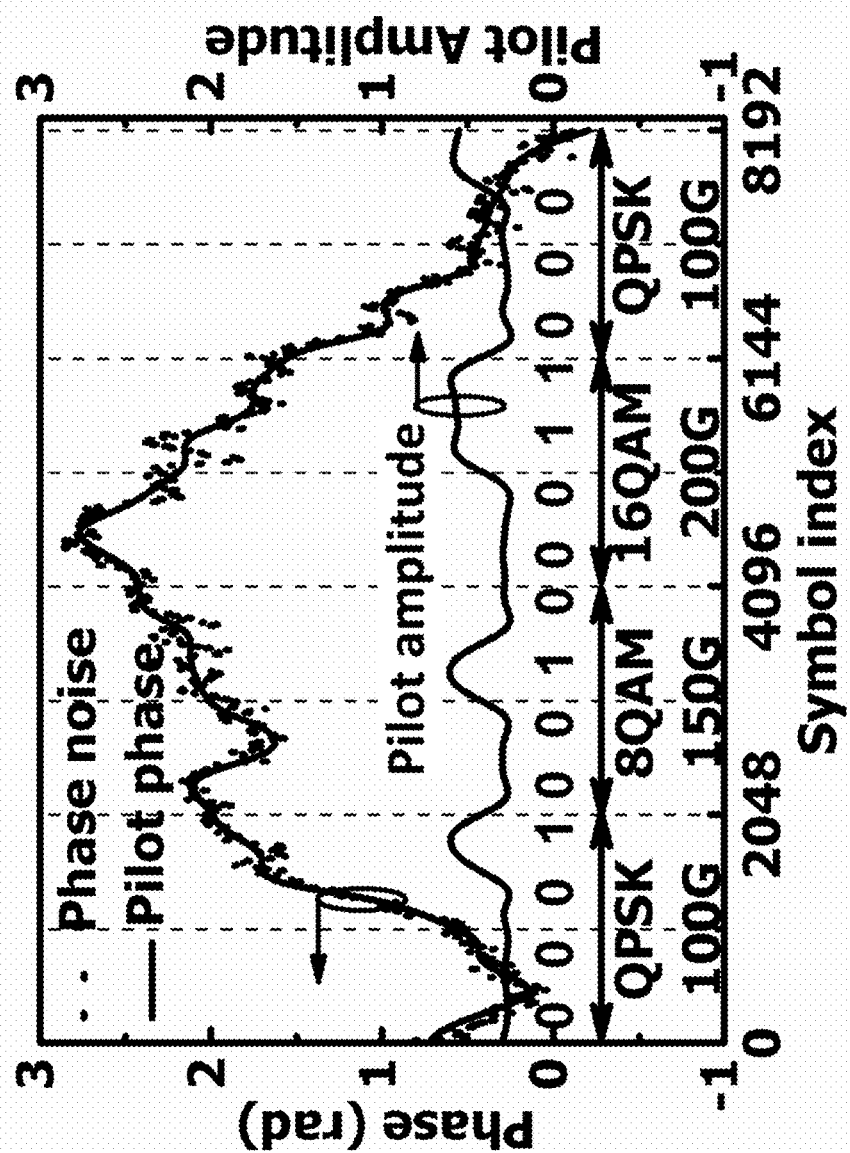
FIG. 12 illustrates the amplitude of a pilot signal modulated according to a 4-bit digital code encoding a modulation format, along with a phase of the pilot signal and a phase noise.

FIG. 12 illustrates the amplitude of a pilot signal modulated according to a 4-bit digital code encoding a modulation format, along with a phase of the pilot signal and a phase noise. It is clear from FIG. 12 that the pilot phase can be used to track the phase noise. The modulation of the amplitude of the pilot signal is as described above with respect to FIG. 2. The results illustrated in FIG. 12 are achievable, for example, using the receiver 1100.

The scope of the claims should not be limited by the details set forth in the examples, but should be given the broadest interpretation consistent with the description as a whole.

What is claimed is:

1. A flexible transceiver comprising:
   a transmitter section; and
   a receiver section comprising:
      a laser;
      a polarizing beam splitter operative to split a received optical signal into orthogonally-polarized components;
      an optical hybrid operative to process the orthogonally-polarized components with respect to an optical signal produced by the laser;
      photodetectors operative to convert the output of the optical hybrid to electrical signals;
      analog-to-digital converters (ADCs) operative to sample the electrical signals;
      a digital signal processor (DSP) operative to process the output of the ADCs to recover data;
      a filter operative to isolate a modulated pilot signal from the output of the ADCs;
      a demodulator operative to determine a digital code from the modulated pilot signal; and
      a controller operative to decode parameter information from the digital code and to adjust configuration of the receiver section according to the parameter information.

2. The flexible transceiver as recited in claim 1, wherein the parameter information includes forward error correction (FEC) parameters.

3. The flexible transceiver as recited in claim 1, wherein the parameter information includes digital signal processing (DSP) parameters.

4. The flexible transceiver as recited in claim 1, wherein the parameter information includes pulse shaping parameters.

5. The flexible transceiver as recited in claim 1, wherein the parameter information includes a number of sub-carriers for frequency division multiplexing (FDM).

6. The flexible transceiver as recited in claim 1, wherein the parameter information includes chromatic dispersion (CD) compensation parameters.

7. The flexible transceiver as recited in claim 1, wherein the parameter information includes carrier phase recovery parameters.

8. The flexible transceiver as recited in claim 1, wherein the parameter information includes digital nonlinear compensation parameters.

9. A flexible transceiver comprising:
   a transmitter section; and
   a receiver section comprising:
      a laser;
      a polarizing beam splitter operative to split a received optical signal into orthogonally-polarized components;
      an optical hybrid operative to process the orthogonally-polarized components with respect to an optical signal produced by the laser;
      photodetectors operative to convert the output of the optical hybrid to electrical signals;
      analog-to-digital converters (ADCs) operative to sample the electrical signals;
      a filter operative to isolate a modulated pilot signal from the output of the ADCs;
      a demodulator operative to determine a digital code from the amplitude of the modulated pilot signal;
      a controller operative to decode parameter information from the digital code and to adjust configuration of the receiver section according to the parameter information;
      a phase extractor operative to determine a pilot phase from the modulated pilot signal;
      a digital subtraction element operative to remove the modulated pilot signal from the output of the ADCs;
      a digital multiplication element operative to use the pilot phase to compensate for phase noise in the output of the subtraction element; and
      a digital signal processor operative to process the output of the multiplication element to recover data.

10. The flexible transceiver as recited in claim 9, wherein the parameter information includes forward error correction (FEC) parameters.

11. The flexible transceiver as recited in claim 9, wherein the parameter information includes digital signal processing (DSP) parameters.

12. The flexible transceiver as recited in claim 9, wherein the parameter information includes pulse shaping parameters.

13. The flexible transceiver as recited in claim 9, wherein the parameter information includes a number of sub-carriers for frequency division multiplexing (FDM).

14. The flexible transceiver as recited in claim 9, wherein the parameter information includes chromatic dispersion (CD) compensation parameters.

15. The flexible transceiver as recited in claim 9, wherein the parameter information includes carrier phase recovery parameters.

16. The flexible transceiver as recited in claim 9, wherein the parameter information includes digital nonlinear compensation parameters.

* * * * *